(12) United States Patent
Park

(10) Patent No.: US 7,673,837 B2
(45) Date of Patent: Mar. 9, 2010

(54) WALL MOUNTED DISPLAY APPARATUS

(75) Inventor: Jae-hoo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 506 days.

(21) Appl. No.: 11/591,592

(22) Filed: Nov. 2, 2006

(65) Prior Publication Data

US 2007/0102608 A1     May 10, 2007

(30) Foreign Application Priority Data

Nov. 5, 2005     (KR)     ...................... 10-2005-0105750

(51) Int. Cl.
 *F16M 11/00*     (2006.01)
(52) U.S. Cl. ................. 248/201; 248/276.1; 248/279.1; 248/286.1; 248/284.1
(58) Field of Classification Search ............. 248/291.1, 248/292.14, 286.1, 917, 920, 923, 276.1; 361/679.21, 679.27, 679.28, 679.29, 679.04, 361/679.05, 679.06; 211/99; 312/223.1–223.2
See application file for complete search history.

(56) References Cited

U.S. PATENT DOCUMENTS

| | | | | | |
|---|---|---|---|---|---|
| 79,474 | A | * | 6/1868 | Johnston | 211/99 |
| 426,313 | A | * | 4/1890 | Paxson | 211/99 |
| 611,929 | A | * | 10/1898 | Norris | 211/99 |
| 945,762 | A | * | 1/1910 | Dieleman | 248/292.13 |
| 1,083,092 | A | * | 12/1913 | Hannah | 248/286.1 |
| 1,090,982 | A | * | 3/1914 | Hawthorne | 248/286.1 |
| 1,476,034 | A | * | 12/1923 | Banks | 211/99 |
| 2,087,757 | A | * | 7/1937 | Foss | 211/119.008 |
| 5,524,772 | A | * | 6/1996 | Simmons | 211/4 |
| 5,622,348 | A | | 4/1997 | Stechly | |
| 6,421,231 | B1 | * | 7/2002 | Jung | 361/679.27 |
| 6,464,195 | B1 | * | 10/2002 | Hildebrandt | 248/460 |
| 6,554,242 | B2 | * | 4/2003 | Kim | 248/371 |
| 6,604,722 | B1 | * | 8/2003 | Tan | 248/276.1 |
| 6,886,701 | B2 | * | 5/2005 | Hong et al. | 211/99 |
| 7,097,143 | B2 | * | 8/2006 | Kim et al. | 248/201 |
| 7,163,087 | B2 | * | 1/2007 | Putnam | 187/203 |
| 7,175,146 | B2 | * | 2/2007 | Kim | 248/279.1 |
| 7,345,870 | B2 | * | 3/2008 | Shin | 361/679.27 |
| 7,408,596 | B2 | * | 8/2008 | Kunz | 348/837 |
| 7,445,187 | B2 | * | 11/2008 | Shin | 248/324 |
| 2002/0167789 | A1 | * | 11/2002 | Novin et al. | 361/681 |

(Continued)

FOREIGN PATENT DOCUMENTS

EP     1486719     12/2004

(Continued)

*Primary Examiner*—J. Allen Shriver, II
*Assistant Examiner*—Alaeddin Mohseni
(74) *Attorney, Agent, or Firm*—Roylance, Abrams, Berdo & Goodman, L.L.P.

(57) ABSTRACT

A display apparatus includes a display main body that displays an image. The display apparatus includes a base plate mounted to an installation surface, a main body bracket that supports the display main body, and a hinge bracket that couples the main body bracket to the base plate so that a side of the main body bracket rotates between a flat position near the installation surface and a rotated position distant from the installation surface. The display apparatus enhances accessibility to a rear side of the display apparatus while it is mounted on the installation surface.

28 Claims, 8 Drawing Sheets

U.S. PATENT DOCUMENTS

| | | | |
|---|---|---|---|
| 2005/0133310 A1* | 6/2005 | Putnam | 187/211 |
| 2005/0152102 A1* | 7/2005 | Shin | 361/681 |
| 2005/0236542 A1* | 10/2005 | O'Neill | 248/286.1 |
| 2005/0236543 A1* | 10/2005 | O'Neil | 248/286.1 |
| 2007/0221807 A1* | 9/2007 | Park | 248/324 |
| 2008/0170358 A1* | 7/2008 | Ikunami | 361/681 |
| 2009/0065670 A1* | 3/2009 | Wu et al. | 248/284.1 |

FOREIGN PATENT DOCUMENTS

| | | |
|---|---|---|
| JP | 2004-012773 | 1/2004 |
| KR | 10-2003-0011056 | 2/2003 |
| KR | 10-2004-0048512 | 6/2004 |
| KR | 10-2005-0058738 | 6/2005 |

* cited by examiner

WALL MOUNTED DISPLAY APPARATUS

CROSS-REFERENCE TO RELATED APPLICATIONS

This application claims the benefit under 35 U.S.C. §119(a) of Korean Patent Application No. 2005-0105750, filed on Nov. 5, 2005, in the Korean Intellectual Property Office, the entire disclosure of which is hereby incorporated by reference.

BACKGROUND OF THE INVENTION

1. Field of the Invention

The present invention relates to a display apparatus. More particularly, the present invention relates to a display apparatus which is mounted on a wall.

2. Description of the Related Art

Generally, a display apparatus such as a TV, a computer or the like displays images. Recently, flat display apparatuses, such as PDPs (plasma display panel) or LCDs (liquid crystal display), have become popular, particularly for use as a TV or as a monitor. Moreover, users often desire that the display apparatuses be mounted on a wall. The wall mounted display apparatus is often used with a display main body which is connected to a VCR (video cassette recorder), a computer, a home theater, or the like. It is more convenient to make the connection, or repair the connection, after the display main body is fixed to the wall. Typically, the wall mounted display apparatus is longer than it is wide.

A conventional wall hanging apparatus for a TV is disclosed in Korean Patent Application No. 10-2002-0085489, filed on Dec. 27, 2002, in the Korean Intellectual Property Office, the entire disclosure of which is hereby incorporated by reference. The wall hanging apparatus includes an angle control device using an angle fixing pin. The angle control device includes a TV hanging member, a base attached to a wall, and a connecting lever that connects the hanging member with the base. The angle control device includes a plurality of angle control grooves formed in the hanging member and the base, a through hole formed in the connecting lever, an angle fixing pin that penetrates both the angle control grooves and the through hole, and a stopper that prevents the angle fixing pin from being separated therefrom.

The angle fixing pin selectively penetrates one of the angle control grooves. Accordingly, the angle control device can control a mounted angle of a TV with respect to a wall.

In the conventional wall hanging apparatus, however, a connecting terminal part for connecting a display main body with a computer, a home theater or the like, is disposed in a rear and lower part of the display main body adjacent to a wall. Thus, it is difficult to approach the connecting terminal part, which makes it difficult to make connections, repairs, and the like. Accordingly, the display main body must be disassembled to make the connection, and may be damaged during the disassembly process.

Accordingly, there is a need for an improved display main body mounted on a wall that allows access to the rear side of the display main body without disassembly.

SUMMARY OF THE INVENTION

An aspect of the present invention is to address at least the above problems and/or disadvantages and to provide at least the advantages described below. Accordingly, an aspect of the present invention is to provide a display apparatus with enhanced accessibility to a rear side of the apparatus while it is mounted on a wall.

The foregoing and/or other aspects of the present invention may be achieved by a display apparatus that includes a display main body for displaying an image. The display apparatus includes a base plate mounted to an installation surface, a main body bracket for supporting the display main body, and a hinge bracket for coupling the main body bracket to the base plate so that a side of the main body bracket rotates between a flat position near the installation surface and a rotated position distant from the installation surface.

The main body bracket may comprise a sliding part that slides in a longitudinal direction of the display main body.

A protrusion may be formed on one of the main body bracket and the hinge bracket, and a protrusion groove may be formed in the other of the main body bracket and the hinge bracket. The protrusion engages the protrusion groove to maintain the main body bracket in the flat position.

The display apparatus may further comprise an elastic member that elastically biasing the main body bracket with respect to the hinge bracket so that the main body bracket maintains the flat position.

The elastic member may comprise a coil spring.

The display apparatus may further comprise a base hinge that is disposed between and coupled to the base plate and the hinge bracket. The base hinge moves the hinge bracket toward or away from the base plate.

In accordance with another exemplary embodiment of the present invention, the foregoing and/or other aspects may be basically achieved by providing a supporting apparatus including a base plate mounted to an installation surface, a main body bracket that supports the display main body, and a hinge bracket that couples the main body bracket to the base plate so that a side of the main body bracket rotates between a flat position near the installation surface and a rotated position distant from the installation surface.

In accordance with another exemplary embodiment of the present invention, the foregoing and/or other aspects may be basically achieved by providing a bracket for supporting a display apparatus. The bracket comprises a base plate adapted to be mounted to an installation surface, a main body bracket adapted to be mounted to a rear surface of a display apparatus, a hinge bracket that couples the main body bracket to the base plate so that the main body bracket rotates about a first rotation axis which is substantially perpendicular to a longitudinal axis of the display apparatus, and a base hinge that couples the base plate to the hinge bracket to move the hinge bracket toward and away from the base plate.

BRIEF DESCRIPTION OF THE DRAWINGS

The above and other objects, features, and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
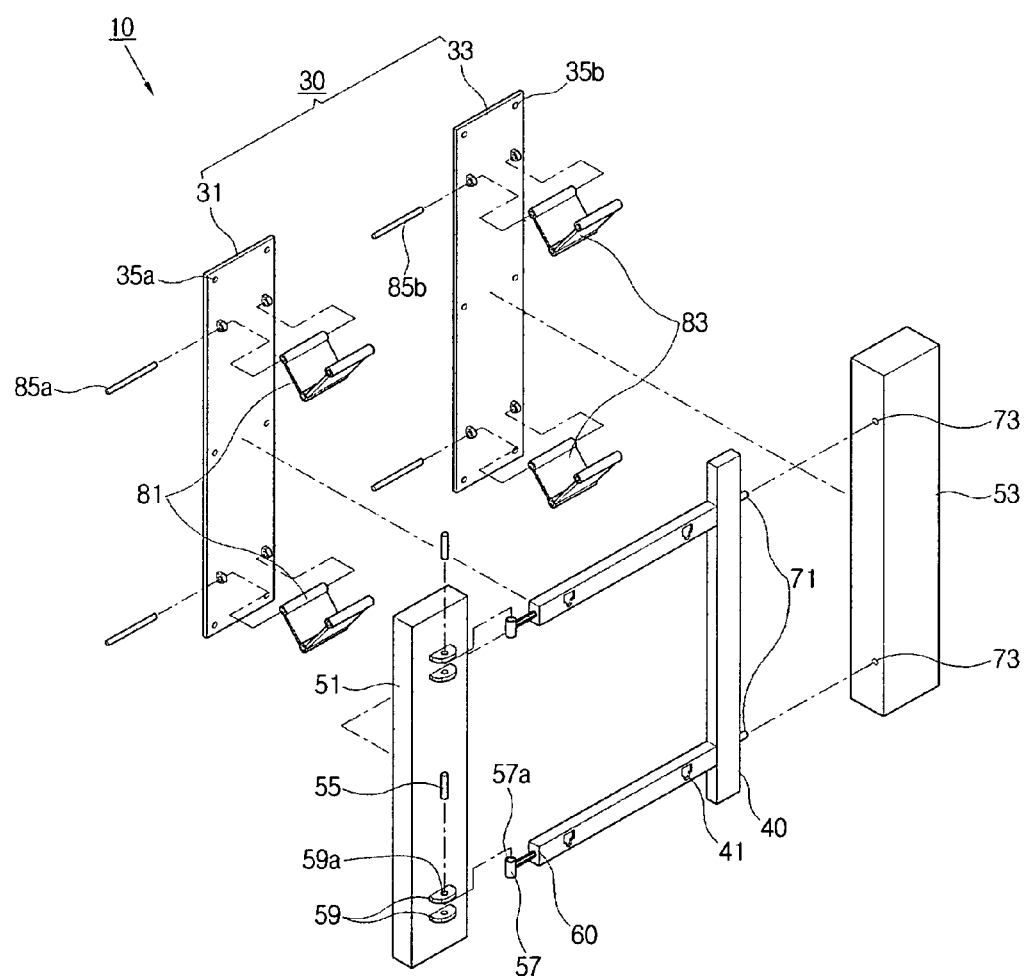
FIG. 1 is an exploded perspective view of a display apparatus according to an exemplary embodiment of the present invention.

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

As shown in FIGS. 1 to 3D, a display apparatus 10 according to a first exemplary embodiment of the present invention includes a display main body 20 for displaying an image, a base plate 30 that is attached to a surface of a wall, a main body bracket 40 for supporting the display main body 20, and a hinge bracket 50. The hinge bracket 50 couples the main body bracket 40 to the base plate 30 so that the main body bracket 40 can rotate with respect to the base plate 30 about an axis which is substantially perpendicular to the longitudinal direction of the display main body 20. The main body bracket rotates between a flat position (that is, a position near the surface of the wall) and a rotated position (that is, a position away from the surface of the wall).

As shown in FIGS. 3A to 3D, the display main body 20 may have a flat display panel such as an LCD (liquid crystal display), a PDP (plasma display panel) or the like. The display main body 20 may also employ an organic electro luminescence display or a CRT (cathode ray tube). The display main body 20 is coupled to the main body bracket 40.

Referring to FIG. 1, a rear side of the display main body 20 is provided with a conventional engaging member (not shown) to engage an engaging slot 41 formed in the main body bracket 40. Alternatively, the display main body 20 may be coupled to the main body bracket 40 by a screw or other coupling members. The rear side of the display main body 20 is provided with connecting terminals (not shown) so that the display may be connected to a VCR (video cassette recorder), a computer, a home theater, or the like. The display main body 20 is preferably longer than it is wide.

As illustrated in FIG. 1, the base plate 30 includes a first base plate member 31 and a second base plate member 33. The first base plate member 31 and the second base plate member 33 may be integrally formed, if desired. The base plate 30 has sufficient strength to support base hinges 81 and 83, the hinge bracket 50, the main body bracket 40 and the display main body 20. The base plate assembly 30 is attached to an installation surface such as a wall by means of a coupling member such as screws through coupling holes 35a and 35b. The base plate 30 is formed as a plate. Alternatively, the base plate 30 may be formed in a rectangular shape or other various shapes. The base hinges 81 and 83 are coupled to the base plate 30 by coupling pins 85a and 85b.

The first base hinge 81, the first hinge bracket member 51, the main body bracket 40, and the display main body 20 are sequentially coupled to the first base plate member 31.

The second base hinge 83, the second hinge bracket member 53, the main body bracket 40, and the display main body are sequentially coupled to the second base plate member 33.

The hinge bracket 50 is disposed between the base plate 30 and the main body bracket 40, and allows the main body bracket 40 to swivel between a flat position and a rotated position. The main body bracket swivels about an axis of the hinge shaft 55, which is substantially perpendicular to the longitudinal direction of the display main body 20. The hinge bracket 50 includes the first hinge bracket member 51 (which is coupled to the first base plate member 31, the first base hinge 81, and the main body bracket 40), and the second hinge bracket member 53 (which is coupled to the second base plate member 33, the second base hinge 83, and the main body bracket 40). The first hinge bracket member 51 includes a hinge shaft 55 about which the main body bracket 40 swivels, and flanges 59 formed with hinge holes 59a into which the hinge shaft 55 is inserted. The main body bracket 40 includes a hinge shaft accommodating part 57 formed with a second hinge hole 57a to accommodate the hinge shaft 55 together with the first hinge holes 59a. Accordingly, the display main body 20 coupled to the main body bracket 40 can swivel between the flat position and the rotated position together with main body bracket 40.

Figure 2:
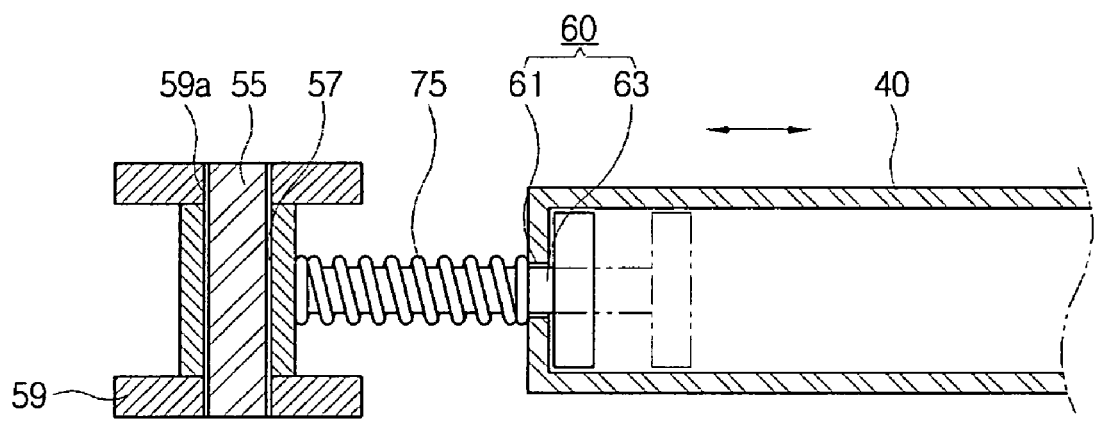
FIG. 2 is a sectional view of a hinge bracket and a sliding part of the display apparatus of FIG. 1.

Referring to FIGS. 1 and 2, the main body bracket 40 includes a sliding part 60 for supporting the display main body 20. The sliding part 60 slides in the longitudinal direction of the display main body 20. The main body bracket 40 is coupled to the first hinge bracket member 51 to swivel between the flat position and the rotated position about the axis of the hinge shaft 55. The main body bracket 40 includes at least one protrusion 71 that protrudes from an end part facing the second hinge bracket member 53 to be detachably coupled to the second hinge bracket member 53. The main body bracket 40 is provided with an engagement slot 41 which has an elongated slot part and a shorter slot part to attach the display main body 20 thereto.

The sliding part 60 includes a sliding hole 61 formed in the main body bracket 40, and a sliding rod 63 that slides in the longitudinal direction of the display main body 20 through the sliding hole 61 within a predetermined range. A pair of sliding parts 60 may be provided on the main body bracket 40 to smoothly move the display main body 20. Accordingly, the main body bracket 40 can move in the longitudinal direction of the display main body 20, and thereby be detachably coupled to the second hinge bracket member 53.

Referring to FIG. 2, an elastic member 75 biases the main body bracket 40 toward the second hinge bracket member 53. The elastic member 75 is preferably a coil spring, but the elastic member 75 may be an air cylinder or the like.

At least one protrusion 71 protrudes from the main body bracket 40 toward the second hinge bracket member 53. In the illustrated embodiment, two protrusions 71 are provided. At least one protrusion groove 73 is formed in the second hinge bracket member 53 to engage the protrusions 71. The protrusions 71 engage the protrusion grooves 73 to maintain the main body bracket in a flat position. It should be understood that the location of the protrusions and grooves may be reversed (i.e., the protrusions 71 may be formed on the second hinge bracket member 53, and the grooves 73 may be formed on the main body bracket 40).

Referring to FIG. 1, the first and second base hinges 81 and 83 are disposed between the base plate 30 and the first and second hinge brackets 51 and 53. The first base hinge 81 is coupled to first hinge bracket member 51, and the second base hinge 83 is coupled to the second hinge bracket member 53 so that the first and second hinge brackets 51 and 53 may move in a perpendicular direction with respect to the surface of the base plate 30. In the illustrated embodiment, the first base hinge 81 includes two first base hinge members that are coupled to the first base plate member 31 and the first hinge bracket member 51, and the second base hinge 83 includes two second base hinge members that are coupled to the second base plate member 33 and the second hinge bracket member 53.

The two first base hinge members and the two second base hinge members are "L" shaped pieces, and the legs of the "L" are substantially the same length. The base hinges 81 and 83 are coupled to the base plate 30 by coupling pins 85a and 85b so that the base hinges pivot about an axis which is substantially parallel to the longitudinal direction of the display main body 20.

Alternatively, the base hinge 80 may have another conventional configuration. Also, alternatively, the second hinge bracket member 53 may be directly coupled to the second base plate member 33 without a second base hinge 83.

By allowing the first and second hinge brackets 51 and 53 to move vertically, the display main body 20 (which is coupled to the main body bracket 40) may move away from the surface of the wall, and therefore, may swivel more smoothly without contacting the wall. Further, when the display main body 20 is mounted on the wall, the rear side of the display main body 20 is more accessible. Consequently, the connecting terminal part formed on the display main body may be more easily reached to make connections or perform maintenance.

A process for assembling the display apparatus 10 according to the first exemplary embodiment of the present invention will now be described, with reference to FIGS. 1 and 2.

Initially, the base plate 30 is attached to a surface of a wall by screw or other coupling members through the coupling holes 35a and 35b. The first and the second base hinges 81 and 83 are respectively coupled to the first and the second base plates 31 and 35, and the first and the second hinge brackets 51 and 53 are respectively coupled to the first and the second base hinges 81 and 83. Then, the sliding part 60 and the elastic member 75 are coupled to the main body bracket 40, and the main body bracket 40 is coupled to the first hinge bracket member 51. The main body bracket 40 is slid so that the protrusions 71 engage the protrusion grooves 73. Next, the display main body 20 is coupled to the main body bracket 40 through the engagement slots 41.

The operation of the display apparatus 10 according to the first exemplary embodiment of the present invention will now be described with reference to FIGS. 3A to 3D.

Figure 3A:
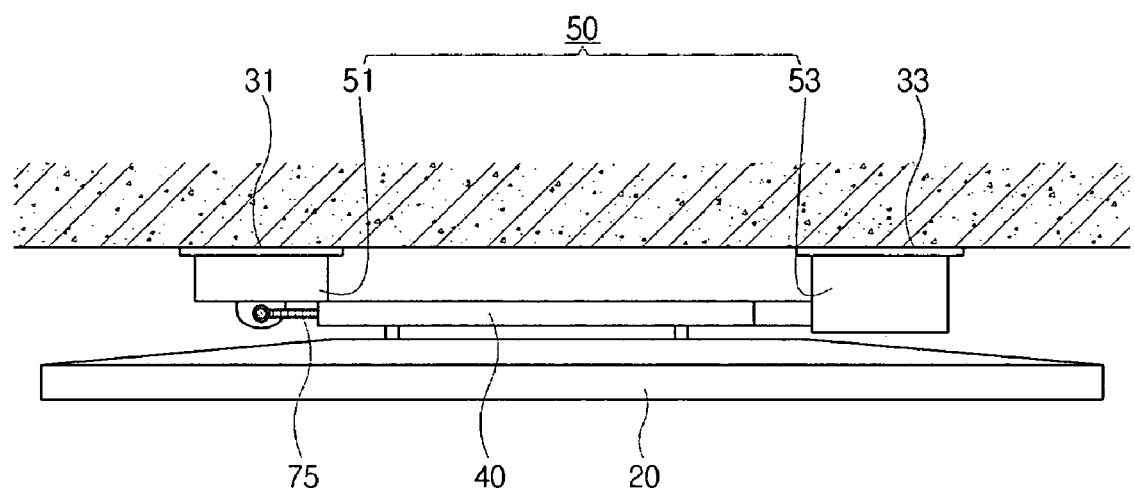
FIGS. 3A to 3D are top plan views illustrating the operation of the display apparatus of FIG. 1.
Figure 3B:
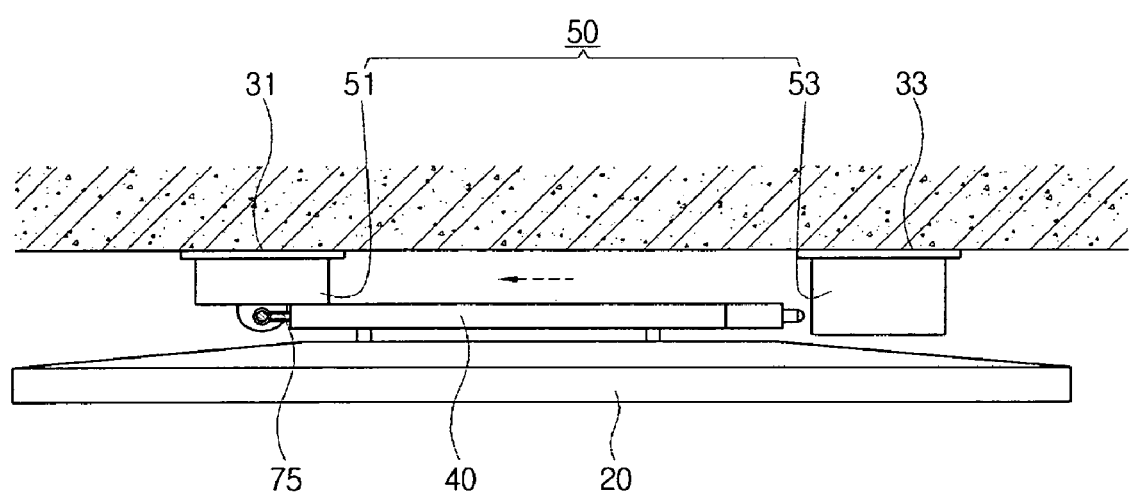
Figure 3C:
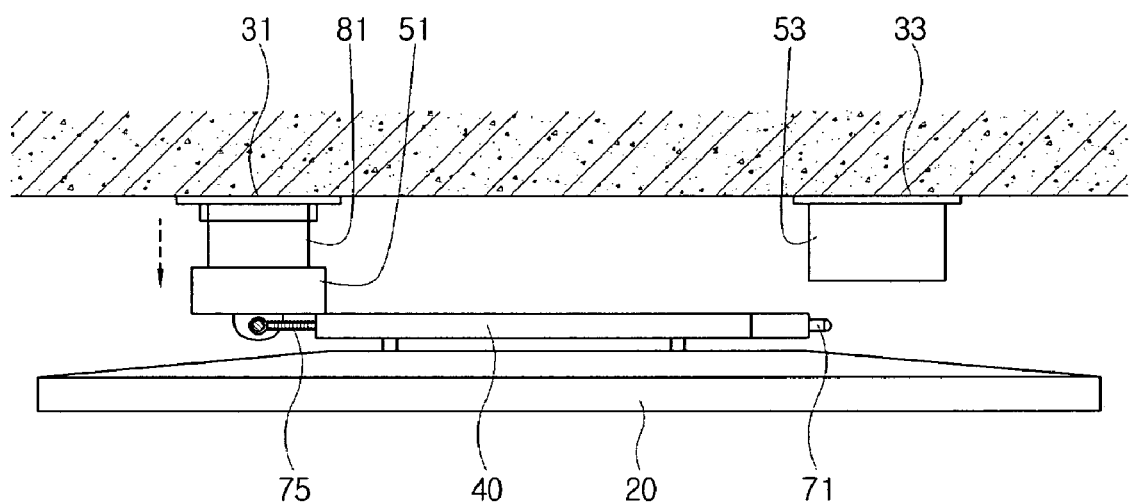
Figure 3D:
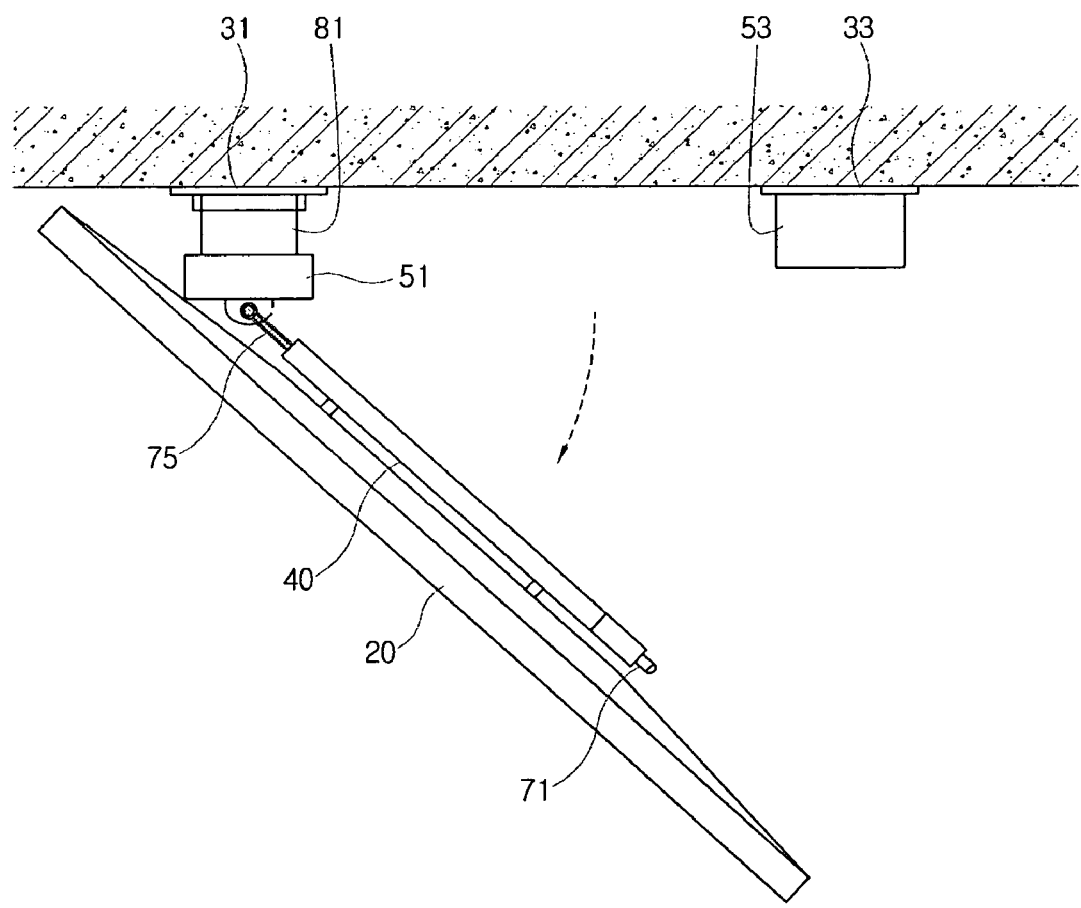

Referring to FIG. 3A, the protrusions 71 engage the protrusion grooves 73 so that the main body bracket 40 is coupled to the second hinge bracket member 53. Referring to FIG. 3B, if the display main body 20 is pushed toward the first hinge bracket member 51, the sliding part 60 slides so that the elastic member 75 is compressed and the main body bracket 40 moves toward the first hinge bracket member 51 to detach the protrusions 71 from the protrusion grooves 73. Accordingly, the display main body 20 coupled to the main body bracket 40 can swivel about the axis of the hinge shaft 55. Referring to FIG. 3C, if the display main body 20 or the hinge bracket 50 is pushed away from the wall, the first base hinge 81 is unfolded, and thus the display main body 20 moves forward a further distance from the wall by means of the base hinges 81 and 83. Accordingly, referring to FIG. 3D, the display main body 20 can swivel without interfering with the wall.

A display apparatus according to a second exemplary embodiment of the present invention will now be described by with reference to FIGS. 4A and 4B.

Figure 4A:
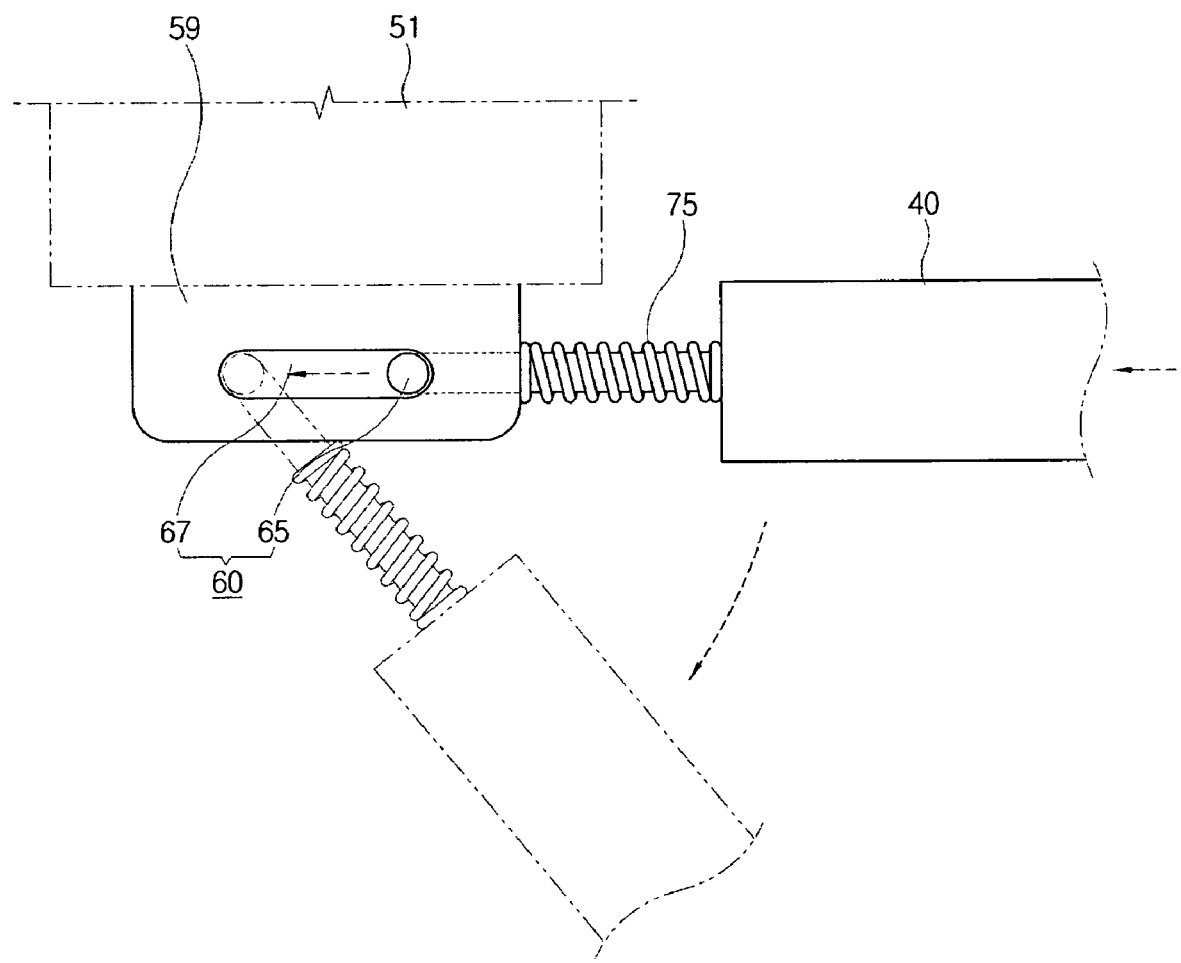
FIGS. 4A and 4B are a plan and a sectional view, respectively, of a hinge bracket and a sliding part according to another exemplary embodiment of the present invention.
Figure 4B:
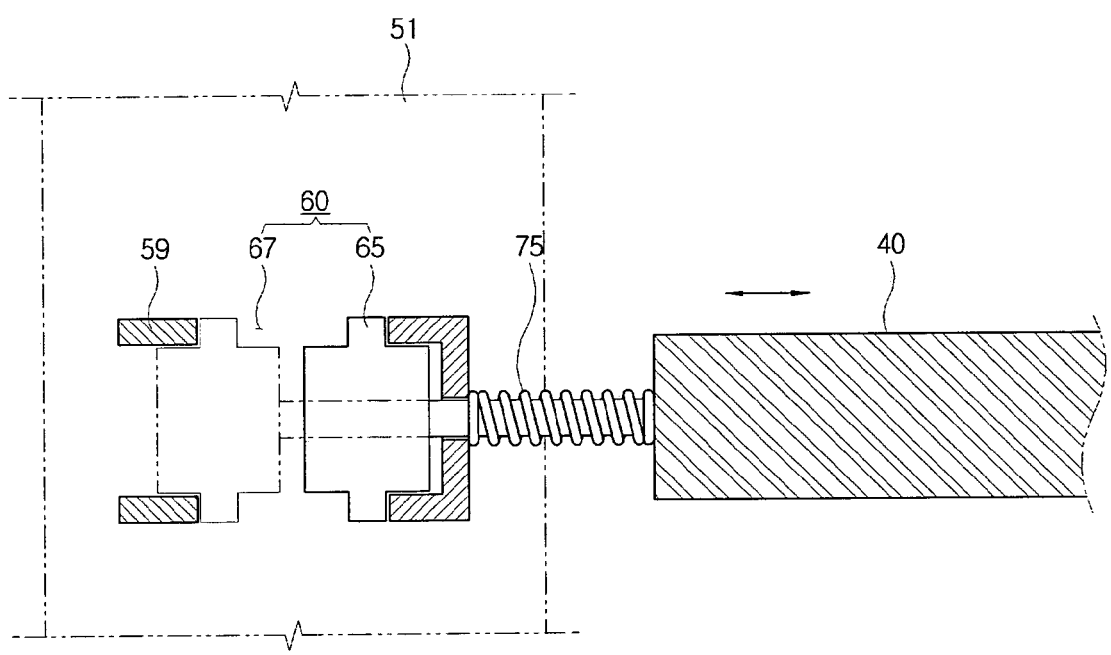

FIGS. 4A and 4B are plan and sectional views, respectively, of a hinge bracket and a sliding part according to a second exemplary embodiment of the present invention. As shown, a sliding part 60 of a main body bracket 40 includes a sliding protrusion 65 that protrudes from the main body bracket 40 and slidably engages a sliding slot 67 in a flange 59 to guide the main body bracket 40. The main body bracket 40 swivels by means of the sliding part 60. The sliding protrusion 65 corresponds to the hinge shaft 55 according to the first exemplary embodiment, and the sliding slot 67 corresponds to the second hinge hole 59 according to the first exemplary embodiment.

The display apparatus according to the exemplary embodiments of the present invention allows the display main body to swivel about an axis of a hinge shaft disposed perpendicularly to the longitudinal direction of the display main body. It also allows the display main body to move forward and backward with respect to a surface of a wall, thereby enhancing accessibility of the rear side of the display main body when it is mounted on a wall. Thus, the display apparatus is convenient to use.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A display apparatus having a display main body that displays an image, the display apparatus comprising:
   a base plate adapted to be mounted to an installation surface;
   a main body bracket that supports the display main body; and
   a hinge bracket that couples the main body bracket to the base plate so that the main body bracket is capable of rotating between a flat position near the installation surface and a rotated position distant from the installation surface;
   wherein the main body bracket comprises a sliding part that slides in a longitudinal direction of the display main body.

2. The display apparatus according to claim 1, further comprising:
   a protrusion on one of the main body bracket or the hinge bracket; and
   a protrusion groove in the other of the main body bracket and the hinge bracket, wherein the protrusion engages the protrusion groove to maintain the main body bracket in the flat position.

3. The display apparatus according to claim 2, further comprising an elastic member that biases the main body bracket with respect to the hinge bracket so that the main body bracket is maintained in the flat position.

4. The display apparatus according to claim 3, wherein the elastic member comprises a coil spring.

5. The display apparatus according to claim 1, further comprising a base hinge disposed between and coupled to the base plate and the hinge bracket to move the hinge bracket toward and away from the base plate.

6. The display apparatus according to claim 1, further comprising:
   a protrusion on one of the main body bracket or the hinge bracket; and
   a protrusion groove in the other of the main body bracket and the hinge bracket, wherein the protrusion engages the protrusion groove to maintain the main body bracket in the flat position.

7. A display apparatus having a display main body that displays an image, the display apparatus comprising:

a base plate adapted to be mounted to an installation surface;

a main body bracket that supports the display main body;

a hinge bracket that couples the main body bracket to the base plate so that the main body bracket is capable of rotating between a flat position near the installation surface and a rotated position distant from the installation surface; and an elastic member that biases the main body bracket with respect to the hinge bracket so that the main body bracket is maintained in the flat position.

8. The display apparatus according to claim 7, wherein the elastic member comprises a coil spring.

9. The display apparatus according to claim 1, further comprising a base hinge disposed between and coupled to the base plate and the hinge bracket to move the hinge bracket toward and away from the base plate.

10. A supporting apparatus for supporting a display apparatus, the supporting apparatus comprising:

a base plate adapted to be mounted to an installation surface;

a main body bracket that supports a display apparatus; and a hinge bracket that couples the main body bracket to the base plate so that the main body bracket rotates between a flat position near the installation surface and a rotated position distant from the installation surface;

wherein the main body bracket comprises a sliding part that slides in a longitudinal direction of the display main body.

11. The supporting apparatus according to claim 10, further comprising:

a protrusion on one of the main body bracket or the hinge bracket; and a protrusion groove in the other of the main body bracket and the hinge bracket, wherein the protrusion engages the protrusion groove to maintain the main body bracket in the flat position.

12. The supporting apparatus according to claim 11, further comprising an elastic member that biases the main body bracket with respect to the hinge bracket so that the main body bracket is maintained in the flat position.

13. The supporting apparatus according to claim 12, wherein the elastic member comprises a coil spring.

14. The supporting apparatus according to claim 10, further comprising a base hinge disposed between and coupled to the base plate and the hinge bracket to move the hinge bracket toward and away from the base plate.

15. The supporting apparatus according to claim 10, further comprising:

a protrusion on one of the main body bracket or the hinge bracket; and a protrusion groove in the other of the main body bracket and the hinge bracket, wherein the protrusion engages the protrusion groove to maintain the main body bracket in the flat position.

16. A supporting apparatus for supporting a display apparatus, the supporting apparatus comprising:

a base plate adapted to be mounted to an installation surface;

a main body bracket that supports a display apparatus;

a hinge bracket that couples the main body bracket to the base plate so that the main body bracket rotates between a flat position near the installation surface and a rotated position distant from the installation surface; and an elastic member that biases the main body bracket with respect to the hinge bracket so that the main body bracket is maintained in the flat position.

17. The supporting apparatus according to claim 16, wherein the elastic member comprises a coil spring.

18. The supporting apparatus according to claim 10, further comprising a base hinge disposed between and coupled to the base plate and the hinge bracket to move the hinge bracket toward and away from the base plate.

19. A bracket for supporting a display apparatus, comprising:

a base plate adapted to be mounted to an installation surface;

a main body bracket adapted to be mounted to a rear surface of a display apparatus;

a hinge bracket that couples the main body bracket to the base plate so that the main body bracket rotates about a first rotation axis which is substantially perpendicular to a longitudinal axis of the display apparatus; and a base hinge that couples the base plate to the hinge bracket to move the hinge bracket toward and away from the base plate;

wherein the base plate comprises a first base plate member and a second base plate member;

the hinge bracket comprises a first hinge bracket member and a second hinge bracket member; and the base hinge comprises first base hinge members for coupling the first base plate member to the first hinge bracket member.

20. The bracket according to claim 19, wherein the hinge bracket moves between a flat position near the installation surface and a rotated position distant from the installation surface.

21. The bracket according to claim 19, wherein the base hinge rotates about an axis substantially parallel to the longitudinal direction of the display apparatus.

22. The bracket according to claim 21, wherein:

the first base hinge members comprise two first base hinge members that are coupled to the base plate; and the base hinge further comprises two second base hinge members that are coupled to the base plate.

23. The bracket according to claim 19, wherein the base hinge further comprises second base hinge members for coupling the second base plate member to the second hinge bracket member.

24. The bracket according to claim 19, wherein the second hinge bracket member is directly coupled to the second base plate member.

25. The bracket according to claim 19, further comprising a main body bracket disposed between the first hinge bracket member and the second hinge bracket member.

26. The bracket according to claim 23, further comprising means for sliding the main body bracket so that it may engage and disengage the second hinge bracket member.

27. The bracket according to claim 26, wherein the sliding means comprises:

a sliding hole formed in the main body bracket, and a sliding rod coupled to the first hinge bracket member and sliding in the longitudinal direction of the display main body through the sliding hole.

28. The bracket according to claim 26, wherein the sliding means comprises:

a sliding protrusion that protrudes from the main body bracket; and a sliding slot in a flange on the first hinge bracket member to receive the sliding protrusion.

* * * * *